United States Patent
Scherzer et al.

(10) Patent No.: US 7,769,050 B2
(45) Date of Patent: Aug. 3, 2010

(54) SYSTEM AND METHOD FOR INTERFERENCE MITIGATION FOR WIRELESS COMMUNICATION

(75) Inventors: Shimon B. Scherzer, Sunnyvale, CA (US); Patrick A. Worfolk, Campbell, CA (US); Armin D. Haken, San Francisco, CA (US); Ronen Vainish, Sunnyvale, CA (US); Subburajan Ponnuswamy, Scotts Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 140 days.

(21) Appl. No.: 12/109,474

(22) Filed: Apr. 25, 2008

(65) Prior Publication Data

US 2008/0227401 A1 Sep. 18, 2008

Related U.S. Application Data

(63) Continuation of application No. 10/730,649, filed on Dec. 8, 2003, now Pat. No. 7,366,202.

(51) Int. Cl.
 *H04J 1/00* (2006.01)
(52) U.S. Cl. .................. 370/480; 370/328; 370/343
(58) Field of Classification Search ......... 370/328–334, 370/480, 343, 344, 380–381, 437, 442–444, 370/465, 468; 455/63.1, 114.2, 278.1, 296
See application file for complete search history.

(56) References Cited

U.S. PATENT DOCUMENTS

| | | | | |
|---|---|---|---|---|
| 5,574,979 A | * | 11/1996 | West ...................... | 455/63.1 |
| 5,835,487 A | * | 11/1998 | Campanella .............. | 370/316 |
| 6,952,454 B1 | * | 10/2005 | Jalali et al. ............... | 375/260 |
| 7,042,858 B1 | * | 5/2006 | Ma et al. .................. | 370/331 |
| 7,215,659 B1 | * | 5/2007 | Chen et al. ............... | 370/338 |
| 7,424,268 B2 | * | 9/2008 | Diener et al. ............. | 455/62 |
| 7,505,397 B2 | * | 3/2009 | Lee et al. ................. | 370/208 |
| 7,548,752 B2 | * | 6/2009 | Sampath et al. .......... | 455/447 |
| 2001/0030949 A1 | * | 10/2001 | Molno et al. ............. | 370/329 |
| 2003/0198200 A1 | * | 10/2003 | Diener et al. ............. | 370/329 |
| 2005/0025101 A1 | * | 2/2005 | Paneth et al. ............. | 370/336 |
| 2005/0073973 A1 | * | 4/2005 | Laroia et al. ............. | 370/329 |
| 2005/0254475 A1 | * | 11/2005 | Kubler et al. ............. | 370/338 |
| 2007/0025269 A1 | * | 2/2007 | Padovani et al. .......... | 370/252 |
| 2008/0049672 A1 | * | 2/2008 | Barak et al. .............. | 370/328 |

* cited by examiner

*Primary Examiner*—Chi H. Pham
*Assistant Examiner*—Kevin Mew

(57) ABSTRACT

Disclosed are systems and methods which provide interference mitigation by making alternative resources available within areas served by wireless communication links. Embodiments provide multiple channel availability in establishing wireless communication links to facilitate interference mitigation. Time domain techniques, spatial processing techniques, and/or frequency domain techniques may be implemented for spectrum management. Embodiments provide wireless base station configurations in which all or a plurality of base station sectors use a same frequency channel and/or in which each sector or a plurality of sectors use all frequency channels. Multi-channel strategies may be implemented such as to provide dynamic selection of a "best" frequency channel, to provide transmission of identical data on multiple channels for combining/selection at the receiver, and/or to provide for dividing the data for transmission on multiple channels.

9 Claims, 7 Drawing Sheets

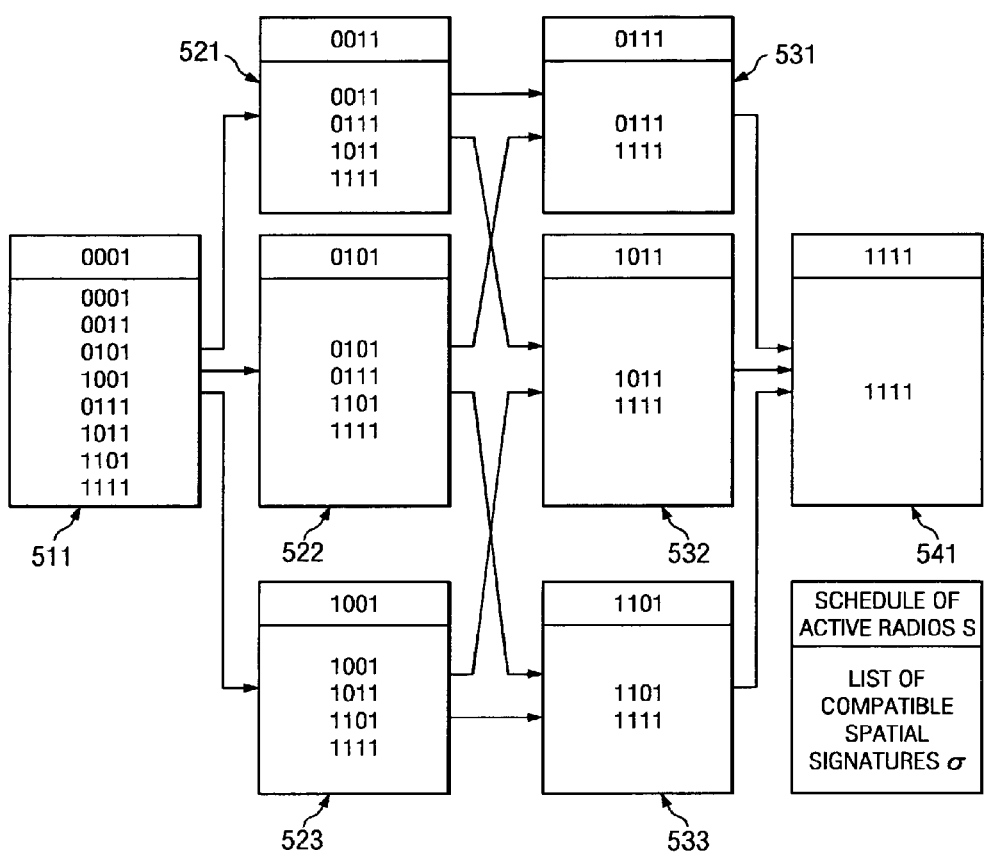

SYSTEM AND METHOD FOR INTERFERENCE MITIGATION FOR WIRELESS COMMUNICATION

This application is a continuation of Ser. No. 10/730,649, filed Dec. 8, 2003, now U.S. Pat. No. 7,366,202.

RELATED APPLICATIONS

The present invention is related to co-pending and commonly assigned U.S. patent application Ser. No. 10/306,972 entitled "Space-Time-Power Scheduling for Wireless Networks," filed Nov. 27, 2002, the disclosure of which is hereby incorporated herein by reference.

TECHNICAL FIELD

The invention relates generally to wireless communication and, more particularly, to interference mitigation for wireless communication.

BACKGROUND OF THE INVENTION

The use of wireless communication links, whether for video, voice, or data, have become prevalent in recent years, particularly in light of the widespread adoption of mobile technology, such as cellular telephones, laptop computers, personal digital assistants (PDAs), pagers, and the like. Wireless communication links are particularly desirable with respect to some situations, such as to avoid obstacles associated with laying cable between communication nodes, providing freedom of movement, etcetera. Accordingly, wireless communication links have been given much consideration by communication infrastructure providers. However, deploying wireless communication links is not without difficulty. In particular, wireless spectrum is often highly regulated and may be prone to interference.

Wireless broadband access has been considered quite extensively in recent years. Although multiple solutions have been experimented with, attempts at providing wireless broadband access, particularly widespread access, has generally not met with commercial success due to inadequate economical conditions, i.e., high cost without sufficient demand. In particular, the need for licensed spectrum in which to provide wireless links has typically resulted in high costs to wireless broadband access providers. Moreover, past wireless broadband access solutions have typically implemented non-standard or application specific equipment, due to each provider developing a unique solution tailored to their particular solution, circumstances, and spectrum, thereby preventing economies of scale and compatibility.

Demand for such wireless broadband access has generally been associated with applications and appears to be correlated to at least some degree to the cost of the service and equipment, the complexity of the implementation, and the reliability of the links. The proliferation of wired broadband access, such as via cable modem and digital subscriber line (DSL), is stimulating the creation of applications requiring relatively large amounts of bandwidth, such as music downloading, video streaming, multi-media presentations, etcetera. However, a large number of nodes desirous of implementing such emerging applications are not yet wired for broadband access and, therefore, cannot adequately access such applications.

Two related wireless technologies are beginning to gain acceptance in providing at least some level of wireless broadband access, these being wireless technologies based on the Institute of Electronic and Electrical Engineers (IEEE) 802.11 and 802.16 standards. The 802.11 standard is directed toward indoor applications and sets forth asynchronous protocols for short range communications, while the 802.16 standard is directed toward outdoor applications and sets forth synchronous protocols for longer range communications, each being operable in unlicensed spectrum such as within the 2 to 11 GHz range. Implementation of such standards facilitates equipment cost reduction by providing for compatibility and economy of scale. However, technologies adopting the foregoing standards heretofore have not adequately addressed the issues associated with commercial or economic deployment of wireless broadband access. For example, although addressing aspects such as communication protocols, the standards alone do not provide for spectrum utilization suitable for reliable or large scale wireless broadband access.

Traditional wireless services rely upon licensed spectrum, in which the use of the spectrum is highly regulated such that sources of interference are avoided, in order to provide for spectrum utilization suitable for reliable or large scale access. However, that spectrum is expensive and is very difficult to obtain. Unlicensed bands, although providing a readily available and inexpensive alternative, present a cost in that the spectrum is open to many simultaneous uses and thus prone to interference leading to link degradation and even blocking. Such disadvantages are particularly prevalent in outdoor applications, where interference from uncontrolled sources can travel long distances, substantially unimpeded.

Accordingly, a need exists in the art for systems and methods providing for utilization of spectrum suitable for reliable and/or large scale wireless access. Particularly, a need exists in the art for systems and methods which mitigate interference with respect to wireless communication links, such as those operable in unlicensed bands.

BRIEF SUMMARY OF THE INVENTION

The present invention is directed to systems and methods which provide interference mitigation by making alternative resources available within areas served by wireless communication links. Embodiments of the invention provide multiple channel availability in establishing wireless communication links to facilitate interference mitigation. For example, systems of the present invention may use time synchronous transmissions and scheduling to allow all or a plurality of available channels to be used throughout a service area and/or the network, thereby eliminate the need for cellular frequency planning according to some embodiments. Accordingly, communication between nodes can be carried out over multiple channels and/or dynamically selected channels to provide for channel diversity. Channel diversity according to preferred embodiments provides strong immunity to interference providing desired levels of quality of service (QoS) and enables utilization of spectrum suitable for reliable and/or large scale wireless access. Embodiments of the present invention are well suited for providing the aforementioned advantages with respect to the use of unlicensed spectrum in providing wireless communication links, and particularly in providing wireless broadband access using unlicensed spectrum.

Preferred embodiments of the present invention implement time domain techniques (such as may include transmission scheduling, high rank modulation, and coding), spatial processing techniques (such as may include grouping nodes by spatial attributes), as well as frequency domain techniques for spectrum management. Implementation of embodiments of the invention using such time domain, spatial processing, and frequency domain techniques provides a dramatic increase of spectrum usage efficiency. In particular, using space/time/frequency scheduling according to embodiments of the present invention facilitates the co-existence of many simultaneous communications in a particular space/spectrum range, without implementing traditional frequency planning (e.g., cellular frequency reuse planning).

Accordingly, embodiments of the present invention provide wireless base station (BS) configurations in which all or a plurality of base station sectors use a same frequency channel. Moreover, embodiments of the present invention provide wireless base station configurations in which each sector or a plurality of sectors use all frequency channels. One such embodiment provides a wireless broadband access network in which all frequency channels are used throughout the service area of the network, while interference associated with their simultaneous use is mitigated. Having availability of a plurality of frequency channels throughout a service area provides options with respect to use of a multi-channel transmission strategy. For example, an ability to choose among frequency channels may be instrumental when a frequency channel is "contaminated" with interference from other radiating sources, such as radiating sources unrelated to a particular wireless communication network which are operating on frequency channels that are part of the unlicensed spectrum.

Multi-channel strategies of the present invention may be implemented in a number of different ways. For example, a multi-channel strategy may provide dynamic selection of a "best" frequency channel, e.g., based on channel quality, out of a plurality of available channels. Additionally or alternatively, a multi-channel strategy may provide transmission of identical data on multiple channels for combining/selection at the receiver, such as based on cyclic redundancy checking (CRC) or other metrics. Similarly, a multi-channel strategy may provide for dividing the data for transmission on multiple channels, such as using interleaving and coding techniques, with a reverse process being implemented at the receiver (e.g., "time/frequency coding"). Selection of a particular frequency channel using the forgoing multi-channel strategies, and perhaps selection of a particular multi-channel strategy to utilize, may depend on such attributes as the nature of the transmission channel and the statistics of the interference.

Embodiments implement admission control techniques to limit the number of communication flows that are admitted to the system based on various system parameters, such as QoS, capacity, bandwidth, etcetera. Additionally or alternatively, embodiments implement access and communication flow scheduling based on space, time, and/or frequency parameters.

Space/time/frequency scheduling according to an embodiment of the invention employs a two-tier scheduling strategy. A first tier scheduler may preferably be executed in a central control RF manager unit (RFMU) and assign transmission time period opportunities, perhaps at a relatively "slow pace," to wireless nodes (WNs) of the base stations to support groups of subscriber stations (SSs). Such transmission time period opportunities may be assigned by an RFMU based upon relative spatial conditions between WNs, uncontrolled interference levels, signal propagation levels, traffic loads, QoS metrics, and/or the like. A second tier scheduler may preferably be executed at each BS and provide real time scheduling, such as based on traffic load per individual SS and/or QoS metrics. According to preferred embodiments, each WN serves SSs within the subscriber groups allocated to the WN by the RFMU scheduler and provides real time scheduling among the SSs of an assigned group. The foregoing approach allows high efficiency while minimizing the processing power utilized in implementing such scheduling.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 shows partial ordering of subscriber station groups based on a spatial signature of the group according to an embodiment of the invention;

DETAILED DESCRIPTION OF THE INVENTION

Figure 1:
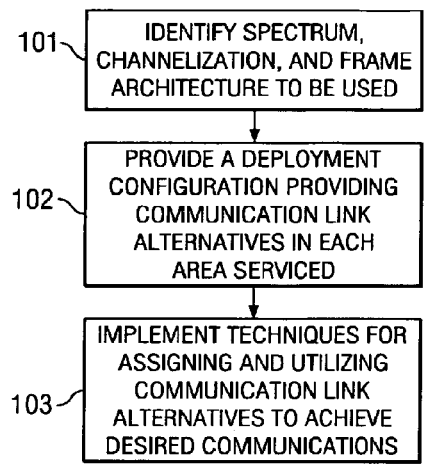
FIG. 1 shows a high level flow diagram setting forth steps for implementing wireless broadband access according to an embodiment of the present invention.

Directing attention to FIG. 1, a high level flow diagram setting forth steps for implementing wireless broadband access according to an embodiment of the present invention is shown. Having determined that wireless broadband access is to be provided, spectrum to be used, and channelization and frame architectures to be implemented in establishing communications via wireless communication links in the selected spectrum are identified (step 101). A configuration for deploying wireless broadband infrastructure to provide communication link resource alternatives throughout a service area is provided (step 102). Techniques are implemented (step 103) for assigning and utilizing wireless communication link alternatives to achieve desired communication objectives, such as to provide a desired QoS as may be measured by bandwidth, delay, jitter, loss rate, and/or other attributes.

Where unlicensed spectrum is to be utilized in providing information communication, such as for implementing wireless broadband access, the sources of interference are not limited primarily to devices in the communication network (referred to herein as internal interference sources), but may include any number of devices external to the communication network (referred to herein as external interference sources). Cooperative operation among network devices, e.g., synchronization and spatial scheduling, may be used to address interference associated with internal interference sources. However, such techniques are ineffective at addressing interference associated with external interference sources. Moreover, typical implementations of synchronization and spatial scheduling rely upon predefined and inflexible channel reuse plans permeating the communication network in order to provide for multi-channel transmission approaching an optimized use of resources.

Providing communication link resource alternatives, such as multiple channels, throughout the service area according to embodiments of the present invention provides communication link diversity, such as in the form of channel usage diversity, and thus may be utilized to provide robust communication operations. In an embodiment wherein multiple channels are made available throughout all portions of a service area, particular channels for use in a communication link may be dynamically selected by each side of the communication link, such as based upon a continuous channel activity evaluation, to mitigate interference associated with external interference sources. Additionally or alternatively, transmission of information to a particular network device may be executed simultaneously or quazi-simultaneously on multiple channels to mitigate interference associated with external interference sources. Spatial segregation, e.g., directional and/or narrow beam antenna configurations, may be utilized according to embodiments to increase channel activity variability options with respect to the various network devices deployed in the communication network. According to one embodiment, spatial scheduling is implemented by creation of network device groupings to optimize channel usage while mitigating interference.

In operation according to the foregoing, network devices may use forward error correction (FEC), automatic request for repetition (ARQ), re-tries, fragmentation, data rate adjustment, variable modulation techniques, and/or the like when communicating over the selected channel or channels.

Implementing robust communication operations according to embodiments of the present invention as described above may utilize different channels in the uplink and downlink communication links, due to the expectation that interference conditions may be appreciably different in each link direction.

Figure 2:
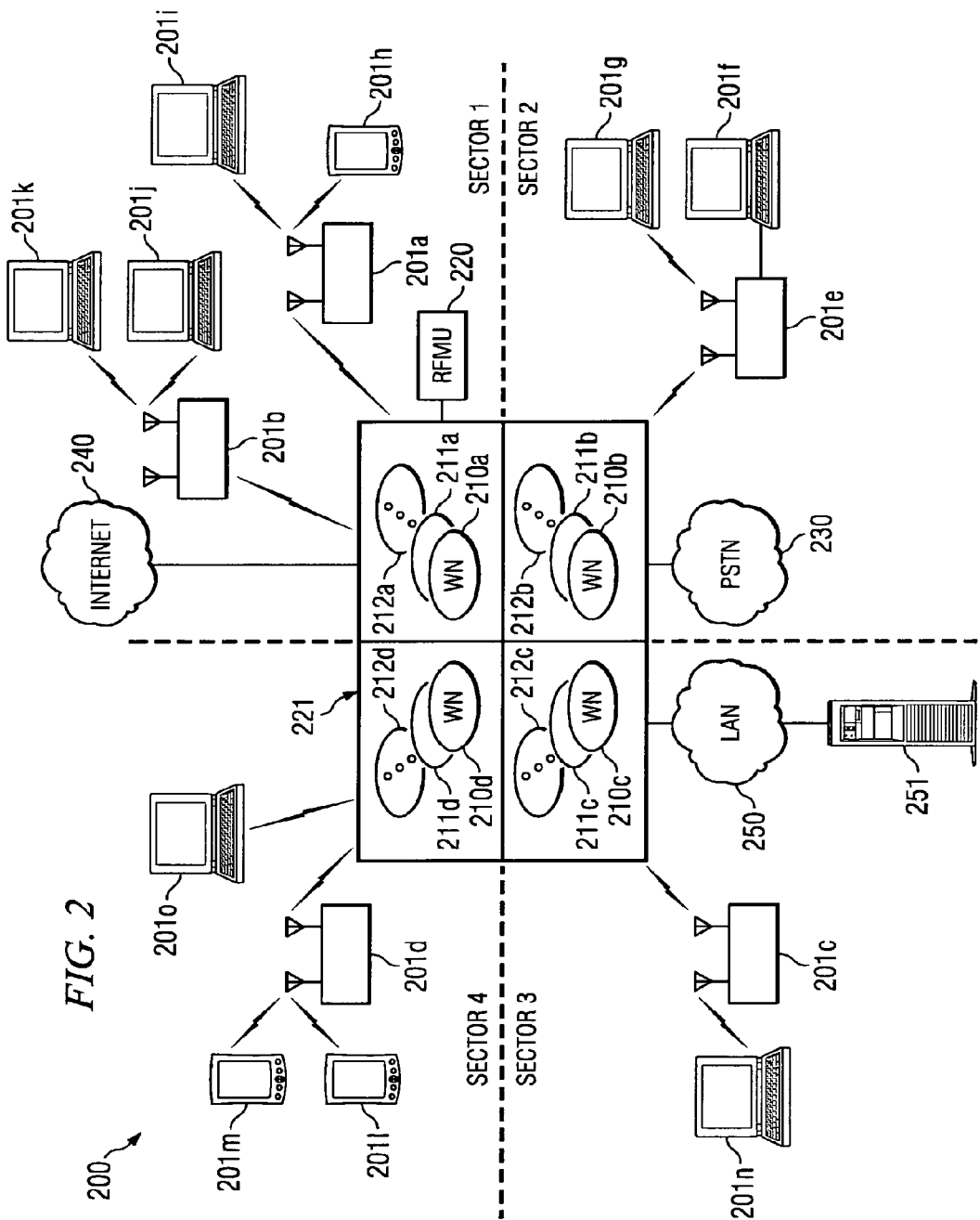
FIG. 2 shows an embodiment of a wireless broadband access system topology as may be implemented according to the steps of FIG. 1.

FIG. 2 illustrates an embodiment of a wireless broadband access system topology as may be implemented according to the steps of FIG. 1. The embodiment of wireless broadband access system 200 of FIG. 2 includes a base station (BS) having a plurality of wireless nodes (WNs), shown as WNs 210a-212a associated with sector 1, 210b-212b associated with sector 2, 210c-212c associated with sector 3, and 210d-210d associated with sector 4, providing wireless communication links throughout a service area to a plurality of subscriber stations (SSs), shown as 201a-201m. It should be appreciated that embodiments of the invention may comprise any number of WNs and/or sectors determined to provide suitable communication link resource alternatives throughout a service area.

The WNs of the illustrated embodiment may comprise any number of configurations, such as wireless access points (APs), routers, switches, etcetera, as may comprise CPE, service provider equipment, and/or the like. WNs are preferably associated with relay communication links. According to one embodiment, WNs utilized according to the invention each operate on a different frequency channel, and thus a plurality of WNs are provided with respect to sectors providing multiple frequency channels therein as shown. Radio frequency management unit (RFMU) 220 is shown coupled to WNs 210a-210d, 211a-211d, and 212a-212d to provide scheduling control as described in detail below.

The SSs of FIG. 2 may comprise any number of user or customer premise equipment (CPE) configurations, such as personal computer systems (e.g., 201c), personal digital assistants (PDAs) (e.g., 201h), wireless access points (e.g., 201a), routers, switches, etcetera, enabled to communicate via wireless links. As illustrated in FIG. 2, SSs may be associated with terminal network links, such as may be associated with termination equipment, and may be associated with relay communication links, such as are associated with wireless access points, routers, switches, etcetera.

The foregoing devices may provide information to and between any number of devices and networks, such as to provide access to server 251 via local area network (LAN) 250 by any or all of SSs 201a-201m, WNs 210a-210d, 211a-211d, and 212a-212d, and/or RFMU 200. Similarly, networks, such as the public switched telephone network (PSTN) 230 and Internet 240, may provide communication links to a variety of devices, as is well known in the art.

Although RFMU 220 is illustrated coupled to one BS (here BS 221) for simplicity, wireless broadband access network 200 may comprise a plurality of BSs and RFMU 220 may be coupled thereto for coordinating the operation thereof. Likewise, although a single RFMU is illustrated in FIG. 2, embodiments of the present invention may implement a plurality of RFMUs, if desired. For example, a plurality of RFMUs may be disposed in wireless broadband access network 200 to provide a distributed processing configuration in which scheduling control processing is distributed among such RFMUs. Additionally or alternatively, scheduling functionality of an RFMU of embodiments of the invention need not be provided by a discrete management unit. For example, scheduling functionality of an RFMU as described herein may be disposed within one or more BSs of wireless broadband access network 200.

Any of the foregoing network devices (e.g., SSs, WNs, BSs, RFMUs) may comprise processor-based systems configured to provide operation as described herein. For example, one or more of SSs 201a-201m, WNs 210a-210d, 211a-211d, and 212a-212d, BS 221, and RFMU 220 may comprise a general purpose processor-based system having a central processing unit (CPU) (e.g., from the Intel PENTIUM family of processors), memory (e.g., random access memory (RAM), read only memory (ROM), magnetic storage, optical storage, etcetera), and appropriate input/output devices (e.g., network interface card (NIC), display monitor, keyboard, pointing device, modem, microphone, speakers, printer, etcetera) operable under control of an instruction set to provide desired operating functions.

Although particular communication link types are illustrated in FIG. 2, it should be appreciated that the link types shown are exemplary to aid in the understanding of the present invention and are not illustrative of any limitation of the application of the concepts of the invention. For example, although shown using wireline communication between BS 221 and RFMU 220, between BS 221 and the PSTN, between BS 221 and Internet 240, between BS 221 and LAN 250, between LAN 250 and server 251, and between SS 201e and SS 201f, any form of suitable communication link may be implemented with respect to the present invention. Accordingly, wireless links (e.g., links the same as those illustrated between WNs and SSs, cellular links, bluetooth links, etcetera), optic links (e.g., fiber optic, free space optic links, etcetera), network links (e.g., LAN, metropolitan area network (MAN), wide area network (WAN), intranet, extranet, the Internet, the PSTN, etcetera) and/or the like may be utilized as desired.

Similarly, the link paths shown are exemplary to aid in the understanding of the present invention and are not illustrative of any limitation of the application of the concepts of the invention. Accordingly, communication between network devices is not restricted to the particular paths shown. For example, communication links (wireless or otherwise) may be established between WNs 210a-210d, 211a-211d, and 212a-212d to provide backhauling or through connectivity, if desired. Additionally, SSs 201a-201m are not restricted to the particular communication links illustrated and, therefore, may establish communication links with one or more of WNs 210a-210d, 211a-211d, and 212a-212d different than illustrated (as well as one or more WNs of other BSs (not shown)).

BS 221 of FIG. 2 is shown having a sectorized configuration, e.g., directional antenna beams or other radiation pattern controls are utilized to provide isolation or separation of wireless communications within sub-areas associated with each sector. Specifically, the illustrated embodiment includes sectors 1 through 4, each providing approximately 90° azmuthal service area coverage with respect to each of WNs 210a-210d, 211a-211d, and 212a-212d. Of course, different numbers and sizes of sectors, or other service area portions, may be implemented or no sectors utilized, according to embodiments of the present invention.

A preferred embodiment of wireless broadband access system 200 implements a plurality of frequency division multiple access (FDMA) channels. For example, frequency channels $f_1$-$f_4$ may be implemented for providing simultaneous and substantially non-mutually interfering communications with respect to a plurality of SSs 201a-201m. The foregoing frequency channels may further be divided into slots or individual time slices (e.g., time division multiple access (TDMA)), thereby providing further channelization for non-mutually interfering communications. Of course, additional or alternative channelization techniques may be implemented according to embodiments of the present invention, such as code division multiple access (CDMA), if desired.

Various techniques may be implemented in establishing downlink (e.g., transmission from a WN to a SS) and uplink (e.g., transmission from a SS to a WN) communication isolation according to embodiments of the invention. For example, frequency division duplexing (FDD) may be implemented wherein different frequency division channels are used in the downlink and uplink communication links (e.g., $f_{d1}$-$f_{d4}$ for downlink communication and $f_{u1}$-$f_{u4}$ for uplink communication). However, preferred embodiments of the invention implement time division duplexing (TDD), wherein downlink communication is isolated from uplink communication in time. A split between downlink and uplink portions of a communication sequence may be asymmetric, perhaps dynamically adjusted to accommodate a current downlink and uplink communication capacity balance, thus implementing an ATDD technique.

Embodiments of the present invention provide for making alternative channels available within each WN sector, e.g., multiple ones of frequency channels $f_1$-$f_4$ may be utilized with respect to one or more WN sectors to provide alternatives with respect to channels used in establishing communication links with particular SSs. However, preferred embodiments of the present invention do not implement a frequency reuse plan (e.g., a typical cellular frequency reuse plan) which limits the reuse of such frequency channels in adjacent/adjoining sectors or even adjacent/adjoining BSs. Instead, embodiments of the present invention allow for use of the same frequency channel (e.g., any of $f_1$-$f_4$) in adjacent/adjoining sectors and/or adjacent/adjoining BSs, as will be better understood from the discussion which follows. A preferred embodiment of the present invention allows for use of all the frequency channels (e.g., all of $f_1$-$f_4$) in adjacent/adjoining sectors and adjacent/adjoining BSs. It should be appreciated that, given the nature of unlicensed spectrum communications being subject to external interference, the use of multiple channels (preferably all channels) in each sector of the communication network facilitates channel usage diversity according to the present invention, thereby providing robust communication operation.

Embodiments of the present invention provide robust interference mitigation, such as with respect to interference associated with external interference sources, using availability of multi-channel service through a wireless broadband access network. For example, configurations implementing the concepts of the present invention provide for adaptive dynamic channel selection such that the best channel out of several available channels may be selected for providing a communication link between particular network node pairs. Additionally or alternatively, embodiments may implement post data selection, such that transmission of identical data on multiple channels is provided for combining/selection at the receiver based on metrics such as cyclic redundancy code (CRC). Similarly, embodiments may implement time/frequency coding, such that data is divided for transmission on multiple channels after interleaving and coding for combining/decoding at the receiver based on a reverse process. Selection of one or more such interference mitigation technique to implement with respect to particular communications may depend upon a number of factors, such as the nature of the transmission channel, the interference statistics, etcetera. Control with respect to the foregoing interference mitigation techniques may be provided by centralized and/or decentralized management algorithms, such as those of RFMU 220, WNs 210a-210d, 211a-211d, and 212a-212d, and/or SSs 201a-201m.

A post data selection interference mitigation technique implemented according to one embodiment provides for multiple copies of the data to be simultaneously transmitted over multiple channels. Accordingly, when the multiple copies of the data arrive at the destination network node, a single, valid copy of the data may be sorted out of the multiple transmissions. For example, data validation techniques, such as CRC, may be utilized with respect to the multiple copies of the data to identify a valid data set for use by the network node.

Figure 10:
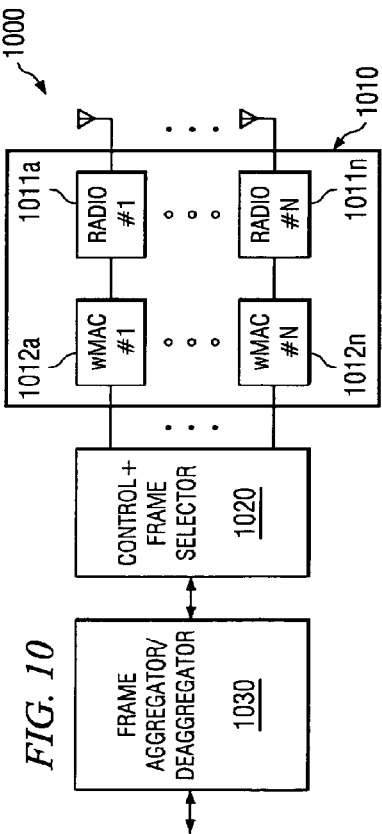
FIG. 10 shows communication front end circuitry adapted to provide post data selection according to one embodiment of the invention.

Directing attention to FIG. 10, communication front end circuitry 1000, as may be implemented with respect to any of SSs 201a-201m and WNs 210a-210d, 211a-211d, and 212a-212d, is shown adapted to provide post data selection according to one embodiment. The illustrated embodiment includes transceiver 1010 wherein N radios (shown as radios 1011a-1011n) and N MACs (shown as wMACs 1012a-1012n) are operable in synchronization with respect to different frequency channels. Each of radios 1011a-1011n is simultaneously transmitting/receiving frames of the same length and including the same data, albeit on a different frequency channel, according to one embodiment.

In providing for transmission of data in a post data selection interference mitigation technique according to one embodiment, frames of variable lengths may arrive at frame aggregator/de-aggregator unit 1030 for packing into fixed length frames. According to a preferred embodiment, the packing process maintains the main bodies and MAC headers of the original frames while encapsulating the frames into a new "packed frame" with new MAC and PHY headers and CRC trailers. Control and frame selector unit 1020 may receive the fixed length frames from frame aggregator/de-aggregator unit 1030 and pass the frames in parallel to each of wMACs 1012a-1012n for transmission by corresponding ones of radios 1011a-1011n.

In providing for reception of data in a post data selection interference mitigation technique according to one embodiment, packed frames are received by each of radios 1011a-1011n and are passed to corresponding ones of wMACs 1012a-1012n. The received frames are passed to control and frame selector unit 1020, wherein control and frame selector unit 1020 selects a "good" frame, such as based on its CRC. The selected packed frame may then be passed to frame aggregator/de-aggregator unit 1030 for de-aggregation to its original components (e.g., the incoming frames discussed above).

To provide for efficiencies in transmission, acknowledgements can be cumulative, such as by providing an ACK frame as part of the payload of the frames being transmitted at the opposite direction. When one of the original frames aggregated into a packed frame is found to be erroneous, a bit map may be used to indicate this failure so that only this particular frame will be re-sent with a later packed frame.

Post data selection interference mitigation techniques, such as the foregoing example, capitalize on the fact that interference on the channels is typically highly un-correlated. For example, using one frequency channel for transmission of data (e.g., one radio/MAC pair for the communication link) the frame error probability may be predicted or measured, such as may be on the order of a probability of 0.1 (10%). However, the use of a second frequency channel for simultaneous transmission of the same data (e.g., two radio/MAC pairs for the communication link) does not decrease the frame error probability by half, but rather results in an order of magnitude decrease in probability due to the un-correlated nature of the probability of the two channels experiencing interference. Accordingly, in the foregoing example, using a second frequency channel for simultaneous transmission of the same data the frame error probability may be on the order of a probability of 0.01 (1%). Although it may appear initially that implementation of the foregoing post data selection interference mitigation technique will cause greater interference to other transmissions, the interference to other transmission is expected to be greatly reduced. Specifically, the frame error probability reduction for the exemplary two channel transmission is equivalent to gain that is much larger than ×2, hence the interference to other transmissions can be reduced by more than the ×2 channel utilization increase. For example, the reduction in probability of frame-error-rate (FER) allows faster transmission of data, using the channels for shorter periods, and/or the use of less transmission power.

The foregoing post data selection interference mitigation technique is well suited to use of the multiple available channels of embodiments of a wireless broadband access network according to embodiments of the present invention. Moreover, post data selection interference mitigation techniques as described herein can readily be implemented using existing hardware. However, the use of multiple channels to simultaneously transmit the same data according to post data selection interference mitigation embodiments described herein results in relatively limited efficiency. For example, when more than one channel is interference free, the maximum throughput is limited to a single channel's performance. If, due to distance for example, use of a channel provides for only 15 Mb/s to be transmitted, a post data selection based system might only provide 15 Mb/s of throughput regardless of the number of channels which are simultaneously capable of this data rate. Such a lack of efficiency may be particularly exacerbated in situations, such as where large distances between transceivers are supported, such as by allowing low data rate (e.g., 256 Kb/s).

Figure 11:
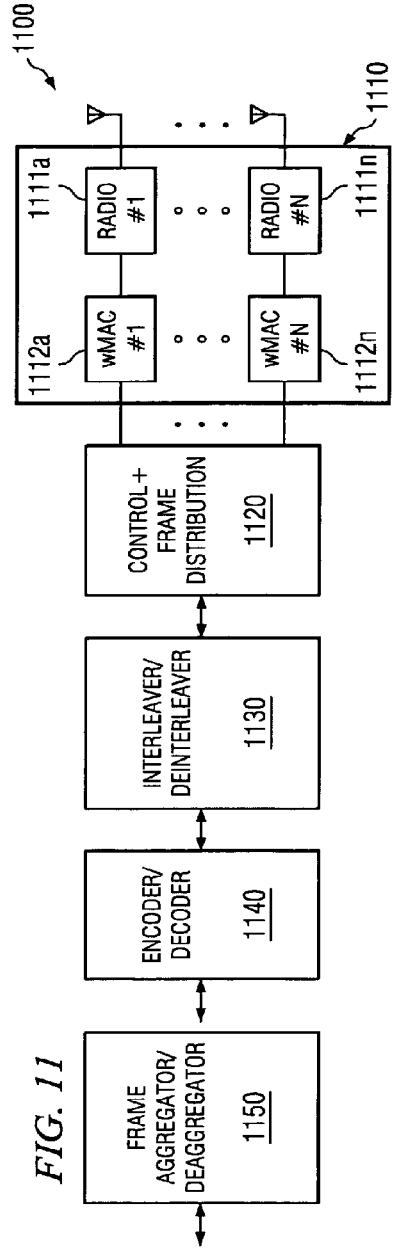
FIG. 11 shows communication front end circuitry adapted to provide time/frequency coding according to one embodiment of the invention.

A time/frequency coding interference mitigation technique implemented according to one embodiment provides for efficient usage of the available spectrum, and consequently may be utilized to increase the effective distance between network nodes. Directing attention to FIG. 11, communication front end circuitry 1100, as may be implemented with respect to any of SSs 201a-201m and WNs 210a-210d, 211a-211d, and 212a-212d, is shown adapted to provide time/frequency coding according to one embodiment. The illustrated embodiment includes transceiver 1110 wherein N radios (shown as radios 1111a-1111n) and N MACs (shown as wMACs 1112a-1112n) are operable in synchronization with respect to different frequency channels. Each of radios 1111a-1111n is simultaneously transmitting/receiving frames of the same length, albeit on a different frequency channel and including differing information, according to one embodiment.

Similar to operation of frame aggregator/de-aggregator unit 1030 discussed above, frame aggregator/de-aggregator unit 1150 provides packing and unpacking of frames. Accordingly, packed frames are passed between frame aggregator/de-aggregator unit 1150 and encoder/decoder 1140. Encoder/decoder 114 of a preferred embodiment provides block encoding using various encoding/decoding techniques, such as convolutional, turbo codes etcetera. Preferably, the coding rate implemented is variable, such as from no coding to ⅒ rate or higher. If there is not enough data for the fixed size frame, additional null bits may be concatenated as needed according to one embodiment. Encoded frames are passed between encoder/decoder 114 and interleaver/deinterleaver 1130 for interleaving/deinterleaving data for simultaneous communication via N radios (shown here as radios 1111a-1111n), such that each radio transmits or receives part of the desired information. Splitting techniques implemented according to the present invention may comprise dividing the aggregated frame into N and adding headers. Of course, other splitting techniques may be implemented in addition to or in the alternative to the foregoing, if desired. Similar to operation of control and frame selector unit 1020 discussed above, control and frame distribution unit 1120 may arbitrate frames between frame interleaver/deinterleaver unit 1030, passing the frames in parallel between each of wMACs 1112a-1112n of transceiver 1110. Of course, the foregoing is but one embodiment of a frequency/time coding system, and alternative embodiments may be utilized according to the present invention.

As with the post data selection interference mitigation techniques discussed above, acknowledgements can be cumulative to provide efficiencies. For example, an ACK frame may be provided as part of the payload of the frames being transmitted at the opposite direction.

It should be appreciated that time/frequency coding interference mitigation techniques as discussed above provide advantages in bandwidth scalability and higher efficiency. For example, when more channels are "clean" (e.g., experience less interference and therefore have a high channel quality), more information can be transmitted. Where 2 channels are clean, and each channel is capable of 15 Mb/s, approximately 30 Mb/s can be transmitted using the time/frequency coding interference mitigation technique described above. Accordingly, when the channels are not being substantially interfered, a system implementing time/frequency coding interference mitigation techniques may transmit N times more data than a system implementing post data selection interference mitigation techniques.

The coding rate implemented by a time/frequency coding embodiment may be adjusted based on bit error rate. For example, if one channel is clean and the other channel experiences a 10% bit error rate, a coding rate providing ½ error correction rate may be invoked. In this example, the system may still carry approximately 15 Mb/s (with no re-try). Additionally or alternatively, channels experiencing higher levels of interference (poorer quality channel) can be discovered throughout operation by monitoring transmission statistics, such that less data is allocated to the poorer quality channels such that bit error rate can be reduced to require less coding, thereby increasing system efficiency.

Another interference mitigation technique, referred to herein as dynamic channel selection (DCS), may be utilized with respect to the multiple channels provided according to embodiments of the invention to provide increased efficiency. Dynamic channel selection may be implemented utilizing any of a number of communication front end circuitry, including communication front end circuitry 1000 of FIG. 10 and 1100 of FIG. 11, having the ability to communicate using a channel selected from a plurality of channels. According to embodiments of the DCS interference mitigation technique, a transceiver transmits data on a selected channel and uses communication link feedback, such as ARQ or re-try rates, as a metric for determining when to switch to a different channel. For example, if a re-try rate threshold (or other metric threshold) is exceeded, the transceiver may coordinate a change to another channel. Additionally or alternatively, if a re-try rate threshold (or other metric threshold) is exceeded, the transceiver may increase the level of fragmentation (i.e., making the fragments shorter), reduce the data rate, increase the interval between fragments, and/or the like to improve the error rate. If the foregoing does not result in appreciable decrease in the re-try rate (or other metric), such as to fall below a threshold amount, the transceiver may coordinate a change to another channel. Channels may be selected by monitoring link metrics, such as communication quality, and/or based upon a channel selection hierarchy.

A system employing DCS is preferably able to rapidly switch network nodes from a low quality channel (high interference level) to a higher quality channel (lower interference level). Scheduler functionality may therefore maintain knowledge of each channels' condition. Channel selection will preferably take into account the channel traffic load as well as the channel condition such that the channel selection decision is based on combined traffic load and interference conditions.

In operation according to one embodiment, a WN is the decision maker with respect to channel selection. A SS may report channel conditions to an associated WN (e.g., using special measurement reports), the WN may combine this information with channel conditions measurements performed by the WN and add traffic load information to produce channel selection decisions. If a channel selection decision is that a channel is to be switched, the WN preferably coordinates the process with the affected SS.

In operation according to an alternative embodiment, each receiver (e.g., each SS receiver and each WN receiver) selects its "preferred" channel for receiving information communication, such as based upon an evaluation of the channel activity at the respective receiver. Such an embodiment provides for the use of different uplink and downlink channels (e.g., an SS may transmit on one channel whereas the corresponding WN transmits to that SS on another channel) as may be desirable in particular situations because interference conditions may be different at each communication link termination point. In implementing the foregoing embodiment, the radios used in a communication link may switch from channel to channel at the TDD frame boundaries and splitting points.

According to a preferred embodiment, SSs have sufficient time between their assigned time slots to scan other available channels (e.g., in the exemplary implementation, the 3 sector channels in addition to the sector channel then in use by the SS). According to one embodiment, a WN may allocate time slots in which a SS is to scan channels. Such scanning of channels may comprise reception of packets transmitted on the downlink by the WN. These packets may be "beacon" packets, data packets directed to other SSs etcetera. According to a preferred embodiment, a SS collects information such as RSSI, CRC errors, physical layer convergence procedure (PLCP) errors, and/or the like, on a per channel and per packet basis. For each channel the SS may sum frame error reports and RSSI values to produce a FER and average RSSI per channel. The channel-FER and channel-RSSI info may be grouped into channel condition reports and sent to an associated WN, such as in time slots allocated by the WN.

According to a preferred embodiment, BSs have receivers tuned substantially full time to each frequency channel, such that no channel scanning need be implemented. Accordingly, in this embodiment a BS can collect FER and RSSI statistics on all channels all the time. In case of no uplink activity, the WN may allocate special probing time slots where associated SSs can send packets from time to time to allow the WN to collect channel statistics. Where uplink power control is implemented, it is expected that SSs will be received by an associated WN with similar signal strength, allowing a WN to aggregate uplink packets into a combined channel-FER and channel-RSSI report. Additionally, WNs preferably operate to monitor downlink queues and the amount of allocated uplink bandwidth to estimate channel load, for use in making DCS decisions.

In making a determination as to whether to switch a SS from one channel to another, DCS algorithms of a preferred embodiment scheduler functionality considers channel conditions, channel traffic load, scheduling efficiency, and/or the like. Channel traffic load may be estimated through such information as the average delay or latency experienced in transmission of data packets, the volume of data packets transmitted in a immediately preceding window, the average volume of data packets transmitted, the allocated time slots, and/or the like. Channel conditions and traffic load may be expressed as:

FER:(FER_WN+FER_SS)*K where FER_WN is the frame error rate on the channel as measured by the WN, FER_SS is the frame error rate on the channel as measured by the SS, and K is a proportion factor coefficient as may be determined by simulation, empirical data, etcetera. According to a preferred embodiment, if channel conditions are lower than a predetermined channel switching threshold (e.g., CHANNEL_SWITCH_THRESHOLD), DCS algorithms will start channel-switching process. According to a preferred embodiment, the DCS algorithms will examine the traffic load on any potential target channels and select the one with sufficient quality and minimum traffic load for the SS channel change.

The foregoing interference techniques may be effectively implemented using scheduling techniques for coordinating the use of alternative resources, such as multiple channels. Communication synchronization and spatial scheduling is preferably implemented according to embodiments of the present invention in order to facilitate effective multi-channel communication. Accordingly, all transmissions using the communication channels available in the system (e.g., frequency and time division channels) are coordinated and scheduled according to embodiments of the present invention, except perhaps transmissions in specific contention slots, such as may be allocated by a WN scheduler. Scheduling with respect to each WN sector is preferably independent, except for group restrictions imposed by a scheduler of the present invention, such as that of an RFMU, and except for an ATDD split, where implemented.

Preferred embodiments of the present invention utilize unlicensed spectrum, such as that in the 2-11 GHz range in the United States. Although subject to interference by unrelated communications in the same band, such unlicensed spectrum is freely available and its use according to the present invention facilitates an economical wireless broadband access solution. A further advantage of utilization of such unlicensed spectrum is the existence of standards, such as the IEEE 802.16 standard, with respect to its use and the availability of components and equipment operable therewith.

Such standards often set forth protocols including channelization and frame architectures for use with respect to particular bands of unlicensed spectrum. For example, the IEEE 802.16 protocols implement time division multiple access (TDMA) operation, such that transmission time is divided into frames that are split into a downlink sub-frame and an uplink sub-frame wherein the frame size and split point can be adjusted as needed. Each sub-frame is divided into slots or individual time slices. Various aspects of such channelization and frame architectures may be adapted for use according to the present invention, thereby providing economies in development and implementation of a wireless broadband access system.

Moreover, various manufacturers produce transmitters, receivers, and other equipment operable in such unlicensed spectrum bands using such standardized channelization and frame architectures. Accordingly, economies may be realized through taking advantage of the availability of such equipment.

Figure 3:
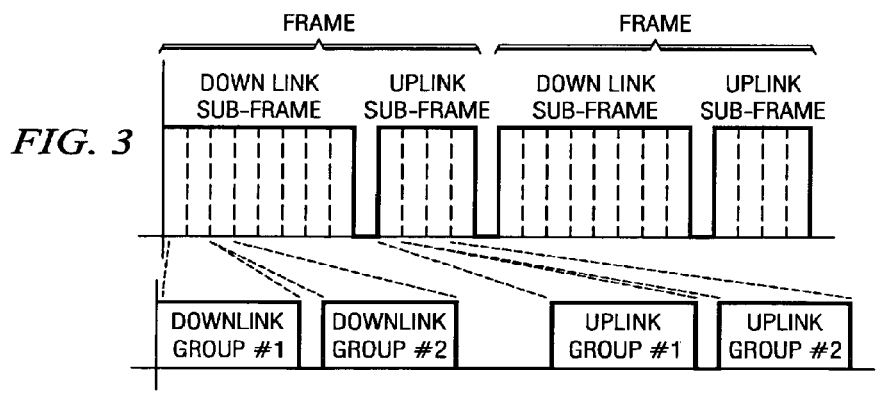
FIG. 3 shows an 802.16 like frame structure as may be implemented according to an embodiment of the invention for scheduled communication with groups of subscriber stations.

For example, embodiments of the present invention may implement an 802.16 like frame structure for scheduled communication with groups of SSs, wherein groups of slots are allocated for specific SSs in the downlink and uplink sub-frames, as shown in FIG. 3. The size and time location of the group within the frames may be determined by scheduling processes of the present invention. The foregoing frame structure provides advantages such as facilitating grouping of multiple transmissions to allow for a common, single preamble at the downlink (e.g., for the entire sub-frame), thereby eliminating the need for preamble per SS. Additionally, efficiencies may be realized with respect to other overhead or control aspects, such as by implementing ARQ through "piggy-backing" the acknowledge character (ACK) messages in the slots coming from the opposite direction. A cumulative ACK strategy can additionally or alternatively be employed, further enhancing link efficiency. Moreover, there is no need to wait for an ACK before sending a new data, according to embodiments, thereby providing transmission efficiency as the "ACK round-trip" could be a significant portion of the link time line.

Accordingly, embodiments of the invention implement a medium access control (MAC) common part sub-layer (referred to herein a wMAC), which is modeled after the 802.16 MAC. For example, a wMAC of the present invention may support management interfaces as defined in the 802.16 standard. Additionally or alternatively, message exchange between a SS and WN may comprise those defined in the 802.16 standard, although the wMAC may not support all such defined messages and/or may support additional or alternative messages. Of course, different MAC configurations may be utilized according to embodiments of the present invention to achieve the above goals.

Figure 4A:
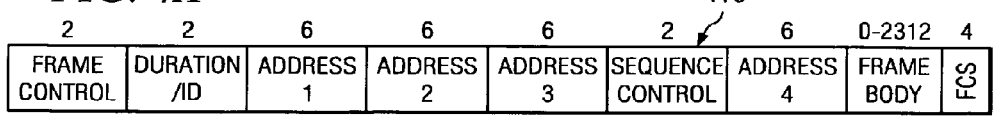
FIG. 4A shows a typical IEEE 802.11 over-the-air frame.
Figure 4B:
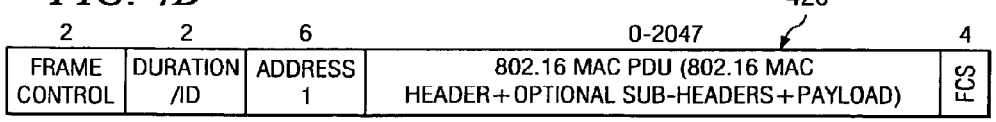
FIG. 4B shows an embodiment of an over-the-air frame which may be used with respect to wireless broadband access system of FIG. 2 according to an embodiment of the invention.

A preferred embodiment of the present invention supports the IEEE 802.11 physical layer (PHY), although such an embodiment may impose some restrictions on PHY overhead (preamble, PLCP, etcetera) and addressing methods. Accordingly, an over-the-air frame of wireless broadband access system 200 may substantially correspond to an 802.11 frame, as shown in FIGS. 4A and 4B wherein frame 410 illustrates a typical 802.11 frame and frame 420 illustrates an embodiment of a frame which may be used with respect to wireless broadband access system 200. However, an 802.11 compliant MAC may not be able to successfully decode the contents of a wMAC frame of the preferred embodiment. Such a frame configuration is desired according to embodiments of the invention in order to facilitate ready use of equipment and infrastructure in providing wireless broadband access by wireless broadband access system 200, even if other systems using equipment conforming to the same standards are not communicatively compatible with wireless broadband access system 200.

The downlink MAC with respect to wireless broadband access system 200 of the illustrated embodiment provides point-to-multipoint operation. This MAC operation according to embodiments of the invention is independent of the actual topology of the network (point-to-point, point-to-multipoint, mesh). Accordingly, a wMAC of preferred embodiments of the invention supports mesh and/or point-to-point extensions in addition to or in the alternative to providing for point-to-multipoint operation.

The foregoing point-to-multipoint operation, wherein service to multiple SSs is provided, is leveraged according to embodiments of the present invention to provide an additional source of diversity gain, that being "time diversity." Using time diversity techniques according to embodiments of the invention, when a SS is unacceptable channel conditions (e.g., unacceptable C/I), such as a result of fading or increased interference, the BS can serve another SS experiencing more acceptable channel conditions. This way, the BS can select the best channel/SS to be served among a given SS group (assuming the conditions are randomly changing and all SSs will be served in turn). Operation according to the foregoing preferably implements fast response and may be implemented as part of a scheduler executed by a WN.

Quality of service (QoS) definition and control is preferably an integral part of the wMAC according to embodiments of the invention. Although the 802.16 standard provides a QoS model, it should be appreciated that the 802.16 standard does not specify a particular scheduling algorithm to achieve a desired QoS. Accordingly, various wMAC functions, such as scheduling, ARQ, fragmentation, packing, and/or the like, are utilized according to a preferred embodiment to work together to provide a desired QoS.

A QoS model typically involves two major functions, those being admission control and scheduling. Admission control limits the number of information flows (as can be thought of as active communication links) that are admitted to the system based on various system parameters. Scheduling is a real-time function that schedules communications so that the QoS can be guaranteed and misbehaving information flows can be shaped.

A scheduler of an embodiment of the present invention provides traffic shaping and packet scheduling in a configuration which may be easily integrated into a reasonably powerful CPU. A scheduler framework implemented according to a preferred embodiments of the invention provide admission control and scheduling functionality. Embodiments of a scheduler framework implemented according to the present invention further provide the ability to meet service level agreements (SLAs), a frame-based queuing model meeting various fairness requirements, a work-conserving scheduler with rate control, a load-sharing scheduler for excess bandwidth, and/or congestion control and packet dropping.

It should be appreciated that, unlike a wire-line scheduler that is responsible for scheduling frames in a fixed capacity channel, a wireless scheduler often copes with a varying channel capacity, such as due to interference, link environment, fading, shadowing, etcetera. However, the use of frames (e.g., TDD frames) may be utilized according to the present invention to provide flexibility in optimizing the complexity of scheduling, such as by considering available channel capacity and making assignments on a frame basis.

According to embodiments of the invention, a scheduler treats both uplink and downlink queues the same, although allocating appropriate contention slots in the uplink. Traffic may flow simultaneously between WNs and SSs in both uplink and downlink directions whether on the same channel in different sectors or on different channels in the same sector, wherein network devices using the same channel in the same sector are queued for serial traffic flow.

A scheduler according to embodiments of the invention provides assignment of communication attributes in addition to channels. For example, a preferred embodiment provides for transmit power assignment. Such an embodiment may be implemented where it is determined that it is advantageous for various network devices to transmit with different power levels, such as to have WNs transmit with different power levels to the different SSs depending on their distance from the WN. Transmit power assignment may be asymmetric, such as by having the SSs power levels remain constant (e.g., chosen so that the WNs receive at least a minimum signal strength from all SSs while dynamically assigning transmit power with respect to WNs).

Preferred embodiment schedulers according to the present invention implement a hierarchical scheduling approach to channel assignment. A first level of such a hierarchical scheduling approach may operate to assign channels to groups of network devices, such as based upon spatial aspects of the network devices. A second level of such a hierarchical scheduling approach may operate to allocate the assigned channels among the network devices of a group or groups. This hierarchical scheduling approach lends itself particularly well to a configuration in which particular scheduling functionality is provided centrally and other scheduling functionality is provided in distributed fashion.

For example, centrally deployed RFMU 220 (FIG. 2) may provide channel assignments as among groups of network devices, perhaps even determining the groupings of the network devices for such channel assignments. Such a centralized system is able to analyze demand and capacity and distribute assignment of resources (e.g., assignment of frequency channels, adjust a split between downlink and uplink portions of a communication sequence, etcetera) to optimize network communications. BS 221, or perhaps each of WNs 210*a*-210*d*, 211*a*-211*d*, and 212*a*-212*d*, upon receiving grouping and channel assignments from RFMU 220, may allocate the assigned channels (e.g., assign particular frequency and/or time slot channels) among the network devices or groups associated therewith. Such a distributed approach is able to implement a network scheduling plan without requiring exceptional processing power to be implemented with respect to any particular aspect of the network. In particular, the aforementioned distributed scheduler functionality may be utilized to manage and coordinate the allocation of time between WN/SS pairs, such as to avoid the need to respond to dynamic variations of hundreds of SSs directly by the foregoing central scheduler functionality.

As described in detail in the above referenced patent application entitled "Space-Time-Power Scheduling for Wireless Networks," scheduling may be utilized as an alternative to interference isolation by frequency planning. Aggressive use of scheduling facilitates the availability and use of a single channel throughout a service area. Carrying this concept to an extreme, embodiments of the invention provide for availability and use of all channels throughout a service area.

Preferred embodiment operation of a scheduler includes the ability to form SS groups (as discussed in detail below), wherein a set of SSs in a SS group possess similar spatial characteristics (e.g., each member of a given SS group has similar spatial distance (wherein here spatial distance between two network nodes is defined as a value that is proportional to the path loss between them) from a corresponding WN) and are serviced by a same WN. Accordingly, in operation according to an embodiment of the invention, WNs 210*a*-210*d*, 211*a*-211*d*, and 212*a*-212*d* continuously or periodically collect signal reception level (e.g., received signal strength indicator (RSSI)) and/or other channel quality measurements for ones of SSs 201*a*-201*m*, and provide this information and traffic load information to scheduler functionality. Using this information, a first scheduler function may make coarse scheduling decisions to allocate channels (time/frequency) across groups, essentially comprising selection of a subset of radios (radios being used herein to refer to a receiver, transmitter, or transceiver operable to provide communications using a particular frequency channel) which may be utilized for simultaneous transmission. A second scheduler function may make finer levels of scheduling decisions to distribute the allocated channels between members of the SS group, such as to meet individual QoS requirements or targets.

According to a preferred embodiment the coarse scheduler functionality is provided in a centralized implementation (e.g., comprising algorithms operable upon RFMU 220 of FIG. 2) and the fine scheduler functionality is provided in a distributed implementation (e.g., comprising algorithms operable upon a plurality network BSs, such as BS 221 of FIG. 2). In operation according to one embodiment, the group members include network nodes for which communication links will be established with a particular WN using a particular frequency channel. Determination of such groups may include identification of groups which may communicate simultaneously, groups which may not communicate simultaneously, a number of frames (or length of time) for which the group assignment is to be implemented, a split between downlink and uplink portions of the communication sequence to be implemented, etcetera. Such group information is provided to the corresponding WN for assignment of particular time slots to the network nodes of an assigned group to provide individual communications meeting desired link metrics. Assignment of time slots to individual network nodes of a group may be based upon channel quality metrics, network node priorities, data type priorities, round-robin or fairness allocations, traffic demand, etcetera.

Channel quality estimation as utilized in a scheduler of the present invention (e.g., scheduler functionality distributed in BSs to make scheduling decisions between SSs of a SS group to meet individual QoS targets) may implement any number of channel quality metrics. For example, FER or packet error rate measures may be utilized as an indication of link quality. External interference power (I) (interference power associated with external interference sources) on the channel and the signal power (C) from a given WN may be translated into an equivalent FER by calculating a carrier to interference (C/I) ratio and using a lookup table for conversion to an FER value. Additionally or alternatively, FER may be measured directly, such as by sending probing frames for collecting frame error statistics. Of course, channel quality metrics useful according to the present invention are not limited to the foregoing.

According to one embodiment of the invention information with respect to an average FER on a channel may be determined using information about the rate at which the channel quality changes. The rate at which channel quality changes may be determined by using external interference power (I) measurement (or using probing frames as discussed above). For example, two time periods may be defined, such as a short period TS (e.g., a few frame lengths) and a long period TL (e.g., approximately one hundred frame lengths), for use determining channel quality changes using the aforementioned external interference power (I) measurement or probing frames. Every TL seconds K measurements may be taken TS seconds apart such that measurements are taken in bursts. The closely spaced measurements may be utilized to provide information regarding fast changes in the channel (e.g., instantaneous channel quality changes) while the different bursts are utilized to provide information regarding slow changes in the channel (e.g., channel quality change trends).

According to one embodiment of the invention, the foregoing channel quality change measurements are converted into an equivalent FER and the geometric mean of the FER values in each burst is computed. Additionally or alternatively, an average of these FER values, over some relatively long time period (e.g., 100*TL), may be calculated (the result of the latter calculation referred to herein as FER_LINK).

FER_LINK represents the effective FER on the link when K retries are used to transmit each packet. When the channel quality changes slowly, FER_LINK equals the true average FER. However, when the channel quality changes quickly, FER_LINK will be smaller (perhaps very much smaller) than the true average FER. Calculation of FER_LINK provides a useful indication of channel quality as affected by external interference sources and, thus, may be utilized in a total channel quality measurement implemented according to embodiments of the invention which takes known or predictable interfering sources into account.

It should be appreciated that, when multiple network nodes are transmitting on the same channel, internal interference is generated. Accordingly, for any combination of transmitting WNs and a given SS a carrier to interference plus noise ratio (CINR) may be computed with respect to the SS. This CINR value may be translated into an equivalent FER (the result of the latter translation referred to herein as FER_INT). The total FER experienced by the SS will be approximately the sum of the FER due to external interference (FER_LINK) and the FER due to self-interference (FER_INT), assuming that errors in transmission due to external interference and internal interference occur independently and that the FER is small. Accordingly, a measurement of total link quality may be calculated using the following equation:

$$FER = FER\_LINK + FER\_INT.$$

Of course, additional or alternative techniques for determining channel quality and/or definitions of channel quality may be implemented according to the present invention. For example, according to one embodiment, system receivers are used to directly evaluate the activity on a channel to measure energy time density, average power, transmission duration statistics, and/or interval between transmission duration statistics.

Using the foregoing signal reception level and/or other channel quality measurements, network node grouping may be implemented according to embodiments of the invention to assign channels among the groups and facilitate simultaneous communication links throughout the network. In providing network node grouping according to one embodiment, the nodes of the wireless access network are organized in a tree, wherein branches of the network node tree begin with a WN connected to the RFMU and leafs may comprise SSs serving one or more end users. As shown in FIG. 2, the branch level WNs may service one or more SSs.

To aid in understanding the concepts of a scheduling process implemented according to the present invention, an exemplary embodiment wherein a total of 8 possible sector spatial groupings of network nodes will be described. Specifically, assuming the case of no interference between channels, all channels are available in all sectors, and 4 sectors are provided with respect to each BS, 8 possible groups with which a SS may be associated comprise: Transmission only in the sector under consideration for a given channel (1 combination), wherein 1 radio is active in the space; Transmission in the sector under consideration together with transmission in one of the other 3 sectors (3 combinations), wherein 2 radios are active in the space; Transmission in the sector under consideration together with transmission in two of the other 3 sectors (3 combinations), wherein 3 radios are active in the space; and Transmission in all 4 sectors simultaneously (1 combination), wherein 4 radios are active in the space. However, it should be appreciated that the invention is not limited to the foregoing number of network node groupings.

It should be appreciated that the example set forth herein is with reference to a single channel for simplicity in explaining the concepts of the present invention. Preferred embodiments of the present invention implement a plurality of channels (most preferably all channels) in each portion of a service area. Accordingly, the concepts set forth herein with respect to a single channel would be repeated for each such channel according to embodiments of the invention.

A 4-bit binary vector (e.g., vector (b1, b2, b3, b4), wherein b1-b4 represent each of 4 bits) indicating interfering/non-interfering radios, as may be determined by RSSI measurements, can be utilized to represent the above 8 groups. In describing vectors indicating non-interfering radios, radios will be referenced herein with sector ids corresponding to the sector numbers in which they are implemented (see FIG. 2 for sector numbers which are labeled clockwise from 1 to 4). Using this nomenclature, radio R1 represents a radio of WN 210a operating in sector 1 for a given channel. Considering for a moment a SS operable in sector 2 the SS is serviced by radio R2 (a radio of WN 210b operating in sector 2 for a given channel) and indicated by marking bit b2 of the binary vector (e.g., setting bit b2 to "1" to indicate RSSI with respect to R2 is above a particular threshold). Other bits of the binary vector (b1, b3, and b4) indicate the status of radios in other sectors with respect to the SS. For example, the SS receiving the signal of radio R1 (a radio of WN 210a operating in sector 1 for the given channel) may be indicated by marking bit b1 of the binary vector (e.g., setting bit b1 to "1" to indicate RSSI with respect to R1 is above a particular threshold), and the SS receiving the signal of radio R4 (a radio of WN 210d operating in sector 4 for the given channel) may be indicated by marking bit b4 of the binary vector (e.g., setting bit b4 to "1" to indicate RSSI with respect to R4 is above a particular threshold). Likewise, the SS not receiving the signal of radio R3 (a radio of WN 210c operating in sector 3 for the given channel) may be indicated by marking bit b3 of the binary vector (e.g., setting bit b3 to "0" to indicate RSSI with respect to R3 is below a particular threshold). Accordingly, the binary vector (1, 0, 1, 1) may be determined to apply with respect to the particular SS. It should be appreciated that in the foregoing example, a binary vector bit of "0" indicates non-interfering communication with respect to a particular radio such that communications can be activated in parallel to R2, so that the BS may serve more than one SS simultaneously using a particular frequency channel when SSs are grouped appropriately.

Applying the concepts of the foregoing example to each SS, SSs having similar spatial characteristics are assigned a same binary vector. Therefore, such a binary vector may be utilized in deriving a "spatial signature" with respect to each corresponding SS, wherein such a spatial signature provides information with respect to the availability of radios for simultaneous use. According to one embodiment of the present invention, the bits of a binary vector not associated with the sector in which the SS is disposed are flipped, such that a "1" becomes a "0" and a "0" becomes a "1," to form a spatial signature. For example, in the foregoing example, the SS is disposed in sector 3, therefore bit b3 of the binary vector remains unchanged but bits b1, b2, and b4 are flipped such that the spatial signature (0, 1, 1, 0) is determined. The appearance of 1's in the spatial signature indicates that the corresponding radios, here radios R2 and R3, can be active in parallel to service two SSs in sectors 2 and 3.

It can be seen from the above that preferred embodiment spatial signatures provide information with respect to the WN radios operable upon a same frequency channel which may be simultaneously operated to provide communication links with respect to groups of SSs. Accordingly, schedules of active radios may be derived from the spatial signatures, such that groups of compatible spatial signatures are associated with each schedule of active radios. The schedules of active radios, and accordingly the spatial signature groups associated therewith, may be assigned a weight Wi where i∈{1, 2, 3, 4} and Wi<Wi+1. According to a preferred embodiment, a RSSI analysis process running at RFMU 220 identifies each SS with an optimal group, based upon group weighting, whereby RFMU 220 attempts to increase the size of the highest-weighted group in the order of W4 to W1. An optimal grouping strategy assigns SSs to one of the eight groups so as to guarantee a given C/I at the receivers while maximizing the probability for parallel transmissions.

Directing attention to FIG. 5, a partial ordering of the 8 possible groups each SS may be identified with (and correspondingly the schedule of active radios), according to the exemplary embodiment described herein, is shown. FIG. 5 demonstrates the partial ordering of SS groups based on the spatial signature of the group. For a particular schedule of active radios S, a spatial signature σ=S may be computed, wherein the group with spatial signature σ is the most restrictive group compatible with S.

In the illustration of FIG. 5, the upper portion of each box provides the particular schedule of active radios ordered and the lower portion of each box provides a list of the spatial signatures which are compatible with the schedule of active radios. As can be readily appreciated from FIG. 5, schedule of active radios $S_1$=(0, 0, 0, 1) is compatible with all 8 spatial signatures as shown in box 511. This schedule of active radios is most restrictive with respect to simultaneous transmission and therefor is weighted as W4. Schedules of active radios $S_2$=(0, 0, 1, 1), $S_3$=(0, 1, 0, 1), and $S_4$=(1, 0, 0, 1) are compatible with 4 of the 8 spatial signatures as shown in boxes 521, 522, and 523, respectively. These schedules of active radios are less restrictive with respect to simultaneous transmission and therefore are weighted as W3. Schedules of active radios $S_5$=(0, 1, 1, 1), S6=(1, 0, 1, 1), and $S_7$=(1, 1, 0, 1) are compatible with 2 of the 8 possible spatial signatures as shown in boxes 531, 532, and 533, respectively. These schedules of active radios are even less restrictive with respect to simultaneous transmission and therefore are weighted as W2. Schedule of active radios $S_8$=(1, 1, 1, 1) is compatible with 1 of the 8 possible spatial signatures as shown in box 541. This schedule of active radios is least restrictive with respect to simultaneous transmission and therefore is weighted as W1. Accordingly, the partial ordering represented by the arrows of FIG. 5 indicates a greater than relationship, showing all the groups of spatial signatures (σ) that are compatible with each schedule of active radios (S).

This partial ordering is very powerful and gives a lot of flexibility to the BS to utilize allocated time efficiently, allowing for a more flexible use of group scheduling. Specifically, a BS can choose a SS for which to schedule transmissions, either on uplink or on downlink, from all the groups whose spatial signature σ satisfies the condition (S && σ)==S. For example, if the central scheduler chooses "1001" as the vector S to activate radios, then any group having "1XX1" (wherein "X" is a "don't care" bit) as the spatial signature will qualify to access the channel.

In initially identifying a network node (WN, SS) with a SS group according to one embodiment, each SS is temporarily allocated on a unit vector group in the sector of the SS (e.g., spatial signature (1, 0, 0, 0) for a SS disposed in sector 1) in both the uplink and downlink directions, without any explicit allocations. Thereafter, the SS may exchange some special packets with the corresponding WN, in order to learn the spatial distance of the SS and move it to a better group to increase the multiplexing factor in the space. In assigning a proper spatial signature for a given SS according to one embodiment, network nodes in the wireless broadband access network in addition to a network node providing a then active communication link with the SS measure received signal strength for both the uplink and downlink transmissions for this SS. This process determines a suitable spatial signature vector for the SS, hence classifying the SS into one of the 8 groups.

Furthermore WNs and SSs may continuously monitor the status of the channel between each WN and SS pair. A channel switching algorithm may be utilized for changing the channel for SSs experiencing poor channel conditions. After changing the channels a BS preferably temporarily assigns this SS to a default unit vector group corresponding to a spatial signature compatible only with radio communication on the newly assigned channel in the sector of the SS (e.g., spatial signature (1, 0, 0, 0) for a SS disposed in sector 1). Thereafter, network nodes measuring the received signal strength and the RFMU RSSI process of a preferred embodiment assigns the SS station to a proper group according to the rules described above.

As described above with respect to an embodiment of the present invention, a central scheduler may provide a semi-static schedule over a period of time where network nodes (WN, SS) are afforded the opportunity to transmit data in the downlink and the uplink. An assumption according to one embodiment is that during this period of time neither significant RF changes nor significant bandwidth requirements have changed (e.g., the bandwidth demands of individual groups have not changed). Another assumption according to one embodiment is that the network nodes of a wireless broadband access network are synchronized, such as using synchronous clocks, external clock signals (e.g., global positioning system (GPS) clock signals), and the scheduler advertises schedules with reference to this common time.

It should be appreciated that a scheduler may choose combinations of various schedules of active radios S to implement in any particular period of time, e.g., a frame, in order to provide access to each network node, regardless of its spatial signature, having a demand for communication capacity. However, a portion of the particular period of time allocated to any such schedule of active radios may be based upon the number of network nodes served in a corresponding spatial signature grouping, the amount of communication demand served by a particular schedule of active radios, etcetera. One or more network nodes may be associated with spatial signature groups serviceable by multiple ones of the schedules of active radios, thereby allowing such network nodes to be serviced in multiple groups, such as to provide a desired link capacity thereto while still providing at least a minimum link capacity to all active network nodes.

The group allocation process may attempt to optimize group assignments to improve the throughput while minimizing the total interference among the concurrent transmissions. Accordingly, a preferred embodiment scheduler attempts to allocate time to a particular group as a single contiguous burst to increase the efficiency. However, this condition may be subject to other constraints imposed on the scheduler.

Figure 6:
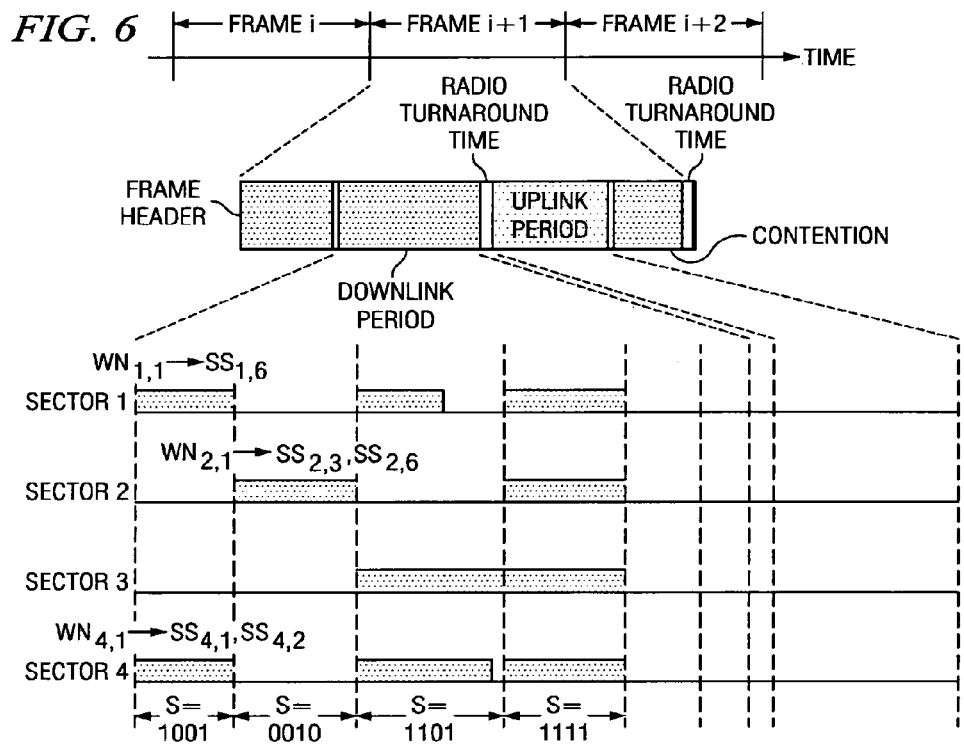
FIG. 6 shows a frame layout of allocations across 4 sectors as may be implemented using a scheduler of the present invention.

Directing attention to FIG. 6, a frame layout of allocations across 4 sectors as may be implemented using a scheduler of the present invention is shown. Frame duration of the frame illustrated in FIG. 6 is subdivided into four main regions, including a frame header (preferably fixed length), a downlink period (preferably variable length), an uplink period (preferably variable length), and a contention period (fixed or variable). As discussed above, a central scheduler may specify a spatial signature to be processed by the BSs of the wireless broadband access network. As illustrated in the embodiment of FIG. 6, each schedule of active radios vector has designated bit positions that correspond to a specific WN in a specific sector. Further, each schedule of active radios vector is preferably associated with a time offset reference to the start of a frame, thereby enabling WNs to activate radios according to a specified pattern. Accordingly, for each frame, WNs traversing through this list of schedule of active radios vectors in the order they specified, choosing members (i.e. SSs) from the eligible groups to grant the access during each time interval, are assured a minimum of self-interference. The scheduler preferably produces commands enabling the network nodes to start transmissions during the appropriate downlink periods and/or uplink periods at defined time boundaries.

According to an embodiment of the invention, it is expected that the network nodes will know traffic demands associated therewith. For example, a SS may know the individual subscriber's traffic requirements that are to be channeled in the uplink to a corresponding WN. Similarly, a WN may know the bandwidth requirements of each individual SS that it serves in the downlink. Such network nodes may map these aggregate bandwidth requirements to a standard scale (e.g., a number of time slots), for use by a scheduler in assigning capacity. A network node, for example, may operate to decide if rising bandwidth requirements can be locally resolved without sending an explicit request to a central scheduler, such as by analyzing the use of the time slots allocated to the network node, analyzing the use of the time slots utilized by network nodes in the same spatial signature group or groups, etcetera. If the network node decides to request more capacity (e.g., additional time slots), the node preferably computes the additional bandwidth requirements in the standard scale (e.g., how many more time slots to be demanded in addition to the already allocated slots) to meet the aggregate bandwidth requirements. Information with respect to additional bandwidth demand may be forwarded the central scheduler of one embodiment by the network node desirous of the increased communication capacity, perhaps with information specifying a maximum time delay between successive bandwidth allocations for the network node. The central scheduler may operate to attempt to dispense successive grants to the requested node, preferably satisfying the aforementioned delay constraint without degrading the allocations associated with other network nodes. Of course, QoS, minimum bandwidth, and other guaranteed link metrics associated with ones of the network nodes may suggest that such time slot allocations take precedent even where degradation of particular other network node links will result. Network nodes preferably keep track of the usage of allocated time slots. In operation according to a preferred embodiment, if a network node detects that the time slots allocated thereto is above that needed, the network node may communicate with the central scheduler of one embodiment to release one or more such time slots. As can be appreciated from the foregoing, in a preferred embodiment network nodes and scheduler functionality, such as a central scheduler operable upon RFMU 220 (FIG. 2) communicate to request bandwidth for a specific group (WN/SS→RFMU), release bandwidth from a specific group (WN/SS→RFMU), inform the success/failure of previous allocations (WN/SS→RFMU), and allocate/deallocate requested bandwidth (RFMU→WN/SS).

The allocation and release of time slots can be considered as managing a pool of time slots. According to a preferred embodiment, a scheduler and the network nodes coordinate to respond rapidly in assigning time slots to serve rising bandwidth requirements and to respond more slowly in releasing time slots associated with falling bandwidth requirements. This fast rise/slow decay time slot assignment technique avoids oscillation between allocation and de-allocation due to short-term bandwidth fluctuations.

Figure 7:
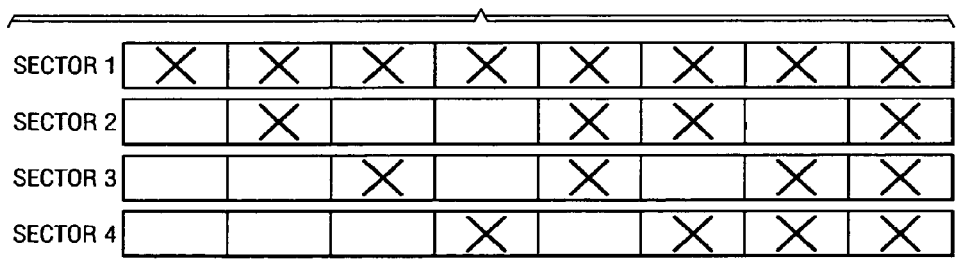
FIG. 7 shows the subscriber station groups of FIG. 5 from the viewpoint of base station sector 1.

As discussed above, network nodes in each sector may be organized into one or more of 8 potential groups by spatial signatures as shown in FIG. 5. Directing attention to FIG. 7, the aforementioned 8 groups are shown from the viewpoint of sector 1, wherein radio R1 of sector 1 is always active with different combinations of other radios. Similar radio activation plans can be made for each sector by considering the spatial signature groups, as shown in the table below wherein all the combinations for activating radios possible in the exemplary embodiment are set forth.

| Sector 1 | Sector 2 | Sector 3 | Sector 4 |
|----------|----------|----------|----------|
| 0001 | 0010 | 0100 | 1000 |
| 0011 | 0011 | 0101 | 1001 |
| 0101 | 0110 | 0110 | 1010 |
| 1001 | 1010 | 1100 | 1100 |
| 0111 | 0111 | 0111 | 1011 |
| 1011 | 1011 | 1101 | 1101 |
| 1101 | 1110 | 1110 | 1110 |
| 1111 | 1111 | 1111 | 1111 |

A review of the bit patterns shown in the foregoing table reveals that there are 16 unique patterns, meaning that in the exemplary embodiment there are 16 possible radio activation patterns across the network (it being appreciated that the null vector (0, 0, 0, 0), wherein all radios are silent, is not shown). Therefore, these 16 bit patterns represent the schedules of active radios vectors S that are available to be communicated to BSs facilitating BSs choosing possible groups of SSs based upon spatial signatures.

Figure 8:
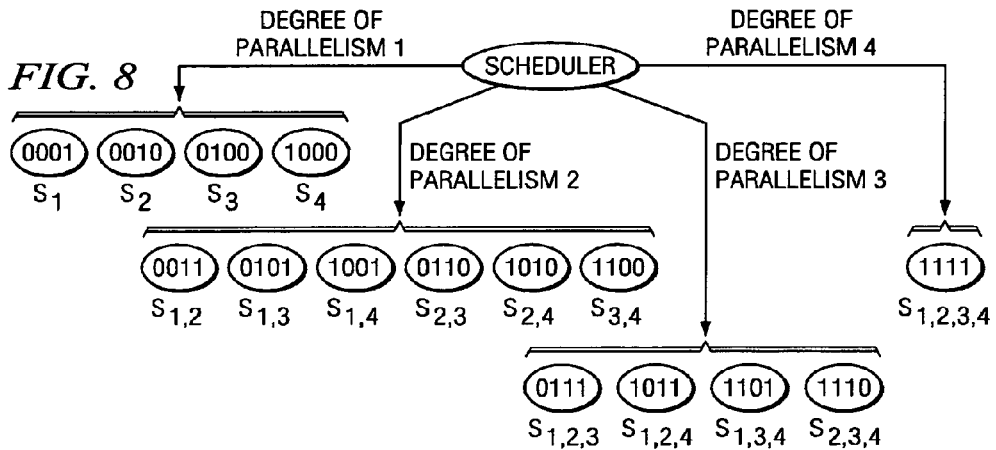
FIG. 8 shows schedules of active radios vectors corresponding to the subscriber station groups of FIG. 5.

The 15 schedules of active radios vectors (omitting the null vector) are shown in FIG. 8, wherein the subscripts correspond to sectors of the active radios. These consecutive unique values can be easily organized in an array (radio vector array) with each value uniquely identifying a data structure describing the properties of a particular radio pattern. This data structure can hold various properties, such as whether the radio pattern is active or not, how long this specific radio pattern is active during a frame (i.e. how many slots are assigned on the corresponding group), etcetera.

According to a preferred embodiment, a reservation manager (RM), such as may be operable as a part of the centralized scheduler, assigns some time period Tdemand (e.g., an integer multiple of slot length) for each of the demanded groups for the uplink and/or the downlink, and actives the corresponding radio vector. Thereafter, network nodes may make explicit requests for downlink and uplink bandwidth depending on the current requirements.

Figure 9:
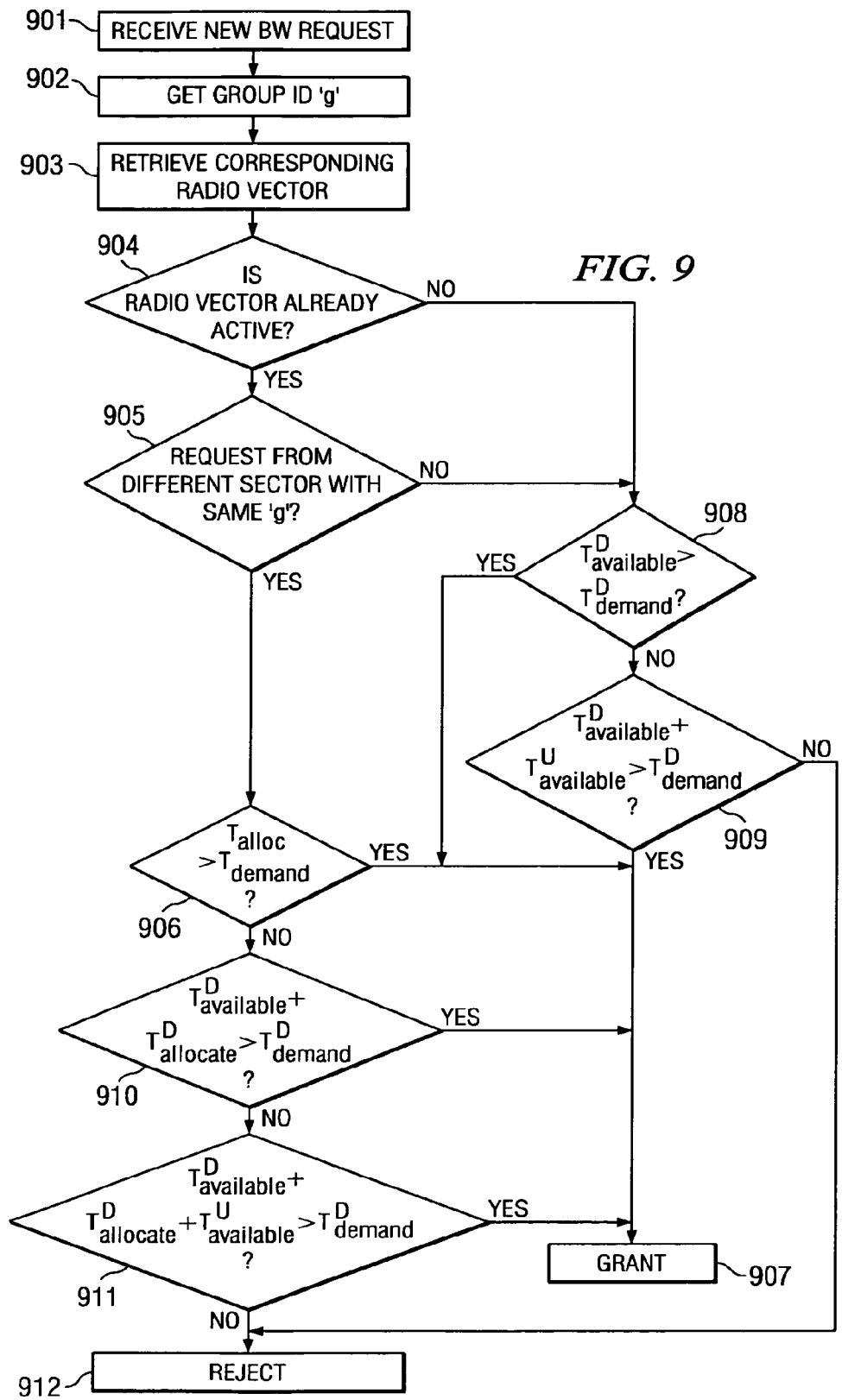
FIG. 9 shows a flow diagram setting forth operation of a reservation manager in servicing bandwidth requests according to one embodiment of the invention.

Operation of a RM in servicing bandwidth requests according to one embodiment is shown in the flow diagram of FIG. 9. The flow diagram of FIG. 9 begins at step 901, wherein the RM receives a new bandwidth request. At step 902, a group id of the network node making the bandwidth request is obtained, such as from the bandwidth request itself. The radio structure for the identified group is retrieved at step 903, such as by using the group id to directly access this structure.

At step 904 it is determined if the radio pattern associated with the retrieved radio structure is already active. If the radio pattern corresponding to the request is not active then this is a type of request to activate a new group. Since this request demands allocation in time, it may or may not successful depending on the residual time. Accordingly, if the radio pattern is not already active, then processing proceeds to step 908 wherein a determination is made as to whether the time slots in the downlink which are available are greater than the time slots in the downlink which are demanded. If the time slots in the downlink which are available are greater than the time slots in the downlink which are demanded, then the bandwidth request is granted at step 907. However, if the time slots in the downlink which are available are not greater than the time slots in the downlink which are demanded, processing proceeds to step 909 wherein a determination is made as to whether the time slots available in the downlink plus the time slots available in the uplink are greater than the time slots in the downlink which are demanded. If the time slots available in the downlink plus the time slots available in the uplink are greater than the time slots in the downlink which are demanded, then the bandwidth request is granted at step 907, perhaps including adjustment of a split between downlink and uplink portions of a communication sequence. However, if the time slots available in the downlink plus the time slots available in the uplink are not greater than the time slots in the downlink which are demanded, then the bandwidth request is rejected at step 912.

If at step 904 it is determined that the radio pattern is already active, then processing proceeds to step 905 wherein a determination is made as to whether the bandwidth request is from a different sector with the same group id. If the radio pattern is already active and if the request came from one of the exiting sectors then this is a type of request to increment the size of the allocation of already activated group. Since this request demands allocation in time, it may or may not successful depending on the residual time. Accordingly, if the bandwidth request is determined not to be from a different sector with the same group id, then processing proceeds to step 908, the operation of which is described above. However, if it is determined that the bandwidth request is from a different sector with the same group id, then processing proceeds to step 906.

At step 906, a determination is made as to whether the time slots allocated are greater than the time slots demanded. If the already reserved time period Talloc for a particular group is greater than the demanded time Tdemand for that particular group, then the request does not require any explicit allocation in time. If Talloc less than Tdemand then the RM should to adjust the already allocated time interval for this group. Accordingly, if the time slots allocated are greater than the time slots demanded then processing proceeds to step 907, wherein the bandwidth request is granted. However, if it is determined that the time slots allocated are not greater than the time slots demanded, then processing proceeds to step 910. At step 910 a determination is made as to whether the time slots available in the downlink plus the time slots allocated in the downlink are greater than the time slots demanded in the down link. If the time slots available in the downlink plus the time slots allocated in the downlink are greater than the time slots demanded in the down link, then processing proceeds to step 907, wherein the bandwidth request is granted. However, if the time slots available in the downlink plus the time slots allocated in the downlink are not greater than the time slots demanded in the down link, then processing proceeds to step 911. At step 911 a determination is made as to whether the time slots available in the downlink plus the time slots allocated in the downlink plus the time slots available in the uplink are greater than the time slots demanded in the downlink. If the time slots available in the downlink plus the time slots allocated in the downlink plus the time slots available in the uplink are greater than the time slots demanded in the downlink, then processing proceeds to step 907 wherein the request for bandwidth is granted, perhaps including adjustment of a split between downlink and uplink portions of a communication sequence. However, if the time slots available in the downlink plus the time slots allocated in the downlink plus the time slots available in the uplink are not greater than the time slots demanded in the downlink, then processing proceeds to step 912 wherein the request for bandwidth is rejected.

Pseudocode for implementing aspects of the foregoing flow diagram are set forth below, wherein:

$T_{available}^D$ is total bandwidth available for allocations in the downlink;

$T_{allocate}^D(g)$ is bandwidth already allocated for the group, i.e., 'g', in the downlink;

$T_{demand}^D(g)$ is bandwidth requested by group 'g'; and $T_{available}^U$ is total bandwidth available for allocations in the uplink.

Pseudocode

---

//available bandwidth plus already allocated bandwidth is enough to satisfy the new demand
IF ($T_{available}^D + T_{allocate}^D(g) > T_{demand}^D(g)$)
    Allocation is successful
ELSE
// available bandwidth plus already allocated bandwidth is not enough to satisfy the new demand
//try to burrow from the uplink period
IF ($T_{available}^D + T_{allocate}^D + T_{available}^U > T_{demand}^D$)
    Allocation successful
ELSE
    No available bandwidth in the system to meet the demand
//available bandwidth is enough to satisfy the new demand
IF ($T_{available}^D > T_{demand}^D$)
    Allocation is successful
ELSE
// available bandwidth is not enough to satisfy the new demand
// try to burrow from the uplink period
IF ($T_{available}^D + T_{available}^U > T_{demand}^D$)
    Allocation successful
ELSE
    No available bandwidth in the system to meet the demand

---

It should be appreciated that the formulas shown with respect to the pseudocode and the flow diagram of FIG. 9 are with respect to the downlink. However, these formulas of the illustrated embodiment are equally applicable to the uplink.

Although embodiments have been described above with respect to a SS communicating with a particular BS in establishing information communication, it should be appreciated that the concepts of the present invention are applicable to multiple BS communication operations. Specifically, the provision of alternative resources with respect to the BSs of a wireless broadband access network of a preferred embodiment provides flexibility with respect to scheduling and interference mitigation using multiple BSs with respect to a particular SS.

To extend the multi-channel operation across the whole network embodiments of the present invention may extend the time/space/frequency scheduling throughout the network such that all BSs' transmissions are coordinated (e.g., extending the above two tier scheduling to the entire network). Alternatively, multi-channel operation may be extended across the whole network by leaving the different BSs uncoordinated, although this approach may lead to some degradation as a result of transmission collisions. As a middle ground between full coordination and no coordination, embodiments of the invention may implement limited coordination, such as by using different transmit power levels on different channels such that sectors facing each other will use different transmit power levels for the same channel. The latter 2 of the above coordination techniques may be preferred according to particular embodiments because of their relative simplicity. In these situations, the other BSs may be treated as any other un-controlled interference source. To guarantee acceptable performance, each WN's activity may be controlled such that the transmission duty cycle on each channel/sector will be limited (e.g., <25%). This limitation can be successfully achieved as a result of the scheduling process described above, since system capacity substantially increases and a smaller percentage of the time is needed to support the desired service. If the transmission duty cycle is kept relatively moderate, transmission failures due to collisions can be easily fixed by re-transmission (ARQ).

Figure 12:
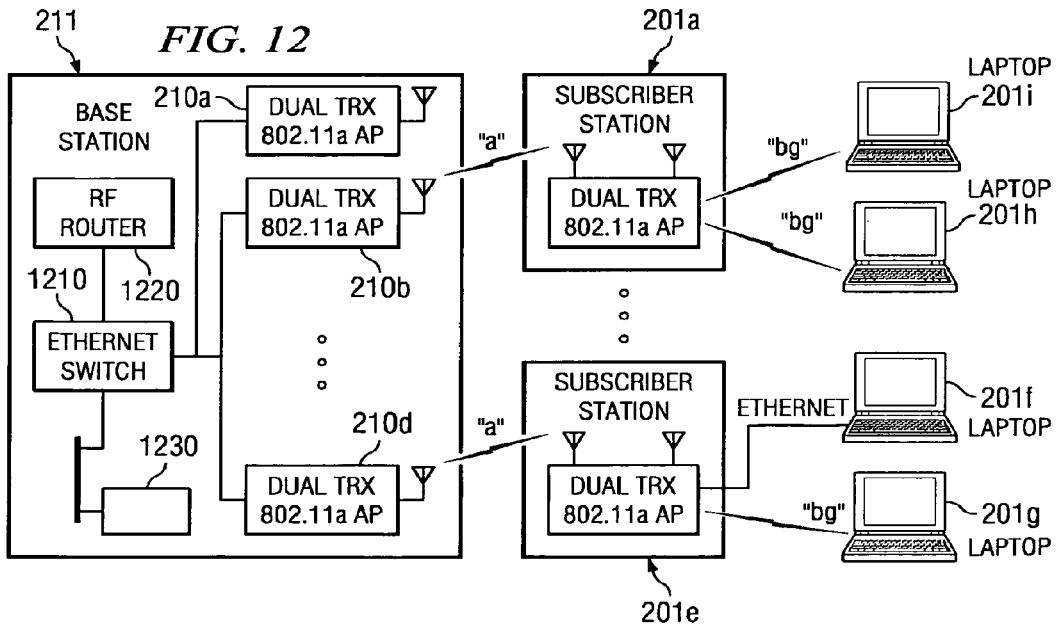
FIG. 12 shows a portion of a wireless broadband access network operable in an unlicensed band according to one embodiment of the invention.

Directing attention to FIG. 12, a portion of a wireless broadband access network operable in an unlicensed band implementing aspects of the forgoing embodiments is shown. As can be appreciated from the detail shown in FIG. 12, the illustrated embodiment implements 802.11 related components as building blocks to achieve the functionality described above. Specifically, BS 221 of the illustrated embodiment includes a set of 802.11a access points adapted to operate as WNs 210a-210d, 211a-211d, and 212a-212d. BS 221 further includes Ethernet switch 1210, power supply 1230, and T1 or other wireline termination (not shown). RF router 1220 of BS 221 shown in FIG. 12 is adapted to provide RF manager functionality, such as that described above with respect to RFMU 220.

SSs 201a and 201e illustrated in FIG. 12 comprise a multiple radio access point (e.g., 802.11 "a", "b", and "g"), and preferably include a router and Ethernet bridge as may be built into the access point architecture. Accordingly, such SSs may be used as a bridge/router enabling terminal equipment, such as desktop and laptop computers, to be connected to the network via Ethernet cable, 802.11b, or 802.11g connections. Of course, the use of the 801.11 "a", "b" and "g" protocols can be interchanged such that "b" or "g" can be used for connection to the BS while "a" is used for connection to the terminal equipment. It should be appreciated that, according to a preferred embodiment, the 802.11 access points are used mostly for the PHY and the hardware, and the 802.11 MAC is replaced to allow the access point to function as described above. The foregoing configuration provides for a low cost solution for both the BS and the SS.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for providing wireless communication, the method comprising:

providing a plurality of frequency channels in each of a plurality of portions of a service area, wherein the plurality of frequency channels are in an unlicensed frequency band, wherein a same frequency channel of the plurality of frequency channels is provided for use in two or more adjacent portions of the service area; and mitigating interference associated with external interference sources by making particular channels of the plurality of channels available for use by network nodes disposed in the portions of the service area according to a two tier scheduling strategy, wherein a first tier of the scheduling strategy includes assigning the plurality of frequency channels to each portion of the service area at a relatively slow pace;

wherein a second tier of the scheduling strategy includes allocating the assigned frequency channels resulting from the first tier of the scheduling strategy among the network nodes disposed in each portion of the service area in real-time; and wherein the network nodes are selected for simultaneous use of said particular channels as a function of spatial characteristic groupings of said network nodes.

2. The method of claim 1, wherein the step of mitigating interference comprises:

selecting a channel from said plurality of channels for communication with a particular network node using adaptive dynamic channel selection to identify a channel having a best communication attribute with respect to said network node.

3. The method of claim 1, wherein the step of mitigating interference further comprises:

selecting a time division of said particular channels for use in communicating with particular network nodes based upon dynamically determined communication link metrics.

4. The method of claim 1, wherein the step of mitigating interference comprises:

selecting at least two channels from said plurality of channels for communication with a particular network node such that transmission of identical data on said at least two channels is provided for post data selection.

5. The method of claim 1, wherein the step of mitigating interference comprises:

selecting at least two channels from said plurality of channels for communication with a particular network node such that data is divided for transmission on said at least two channels for time/frequency coding.

6. The method of claim 1, wherein the step of mitigating interference comprises:

limiting transmission duty cycles of network nodes with respect to each active channel of said plurality of channels.

7. The method of claim 3, wherein the dynamically determined communication link metrics comprise one of: interference level information, signal propagation level information, traffic load information, and quality of service information.

8. The method of claim 1, wherein said mitigating interference comprises assigning a different channel of said plurality of channels for use by a particular network node in an uplink and a downlink.

9. A wireless communication network system, comprising:

a plurality of communication sectors of a service area, wherein each communication sector has a plurality of network nodes and a plurality of channels associated therewith, and wherein adjacent ones of said communication sectors have at least one same channel of said plurality of channels associated therewith; and channel management control apparatus making particular channels of said plurality of channels available for use by the network nodes as a function of external interference experienced with respect to one or more channels of said plurality of channels, wherein the channel management control apparatus implements an at least two tier channel scheduling strategy;

wherein a first tier of the channel scheduling strategy includes assigning the plurality of channels to each communication sector at a first rate, and where a second tier of the channel scheduling strategy includes allocating the assigned channels resulting from the first tier of the channel scheduling strategy among the network nodes in each communication sector in real-time, the first rate being less than real-time;

wherein the first tier of the channel scheduling strategy assigns transmission time period opportunities to communication network base station nodes to support groups of subscriber station nodes;

wherein the second tier of the channel scheduling strategy assigns transmission time periods among subscriber station nodes of the groups of subscriber station nodes; and wherein the channel management control apparatus makes a different channel of the plurality of channels available for use by a particular network node in an uplink and a downlink.

* * * * *